(12) United States Patent
Liu

(10) Patent No.: US 12,533,478 B2
(45) Date of Patent: Jan. 27, 2026

(54) OIL LEAKING PREVENTION STRUCTURE AND AROMATHERAPY MACHINE WITH THE SAME

(71) Applicant: Dongguan Yiting Household Products Co., Ltd., Dongguan (CN)

(72) Inventor: ShiBo Liu, Dongguan (CN)

(73) Assignee: Dongguan Yiting Household Products Co., Ltd., Dongguan (CN)

( * ) Notice: Subject to any disclaimer, the term of this patent is extended or adjusted under 35 U.S.C. 154(b) by 636 days.

(21) Appl. No.: 17/986,039

(22) Filed: Nov. 14, 2022

(65) Prior Publication Data

US 2024/0082513 A1 Mar. 14, 2024

(30) Foreign Application Priority Data

Sep. 9, 2022 (CN) .......................... 202222409021.1

(51) Int. Cl.
*A61M 11/04* (2006.01)
*A61L 9/14* (2006.01)
*A61M 21/02* (2006.01)

(52) U.S. Cl.
CPC ................. *A61M 11/04* (2013.01); *A61L 9/14* (2013.01); *A61M 21/02* (2013.01); *A61L 2209/13* (2013.01)

(58) Field of Classification Search
CPC .......... A61L 9/14–145; A61L 2209/13; A61M 11/00–003; A61M 11/02–04; B05B 1/00; B05B 1/302; B05D 1/02; F16K 1/14; F24F 6/14; F24F 2006/143
See application file for complete search history.

(56) References Cited

U.S. PATENT DOCUMENTS

| 2,777,135 | A | * | 1/1957 | Harkness | .................. E03D 1/34 4/395 |
| 3,191,277 | A | * | 6/1965 | Glasgow | ................... F16K 1/14 29/890.122 |
| 3,572,590 | A | * | 3/1971 | Malone | ................. B05B 11/043 239/326 |
| 7,527,247 | B1 | * | 5/2009 | Krueger | .................... A61L 9/14 261/88 |
| 10,691,148 | B2 | | 6/2020 | Pillai et al. | |
| 10,712,722 | B2 | | 7/2020 | Pillai et al. | |
| 10,765,771 | B2 | | 9/2020 | Hsu | |
| 2002/0179146 | A1 | * | 12/2002 | Nicewarner | .............. F16K 1/14 137/413 |

(Continued)

*Primary Examiner* — Rachel T Sippel (57) ABSTRACT

An oil leaking prevention structure, used in an aromatherapy machine having a spraying port and a liquid reservoir, includes a rectifying chamber arranged in the aromatherapy machine, one side of the rectifying chamber communicates with the spraying port, the other end thereof communicates with the liquid reservoir, some essential oil stored in the liquid reservoir and atomized into mist, the mist enters the rectifying chamber and is ejected from the spraying port. The middle of the rectifying portion communicates with the leak-proof portion, the peripheral edge of the rectifying portion is also communicated with the side wall of the leak-proof portion, the leak-proof portion has the role of preventing leakage when the aromatherapy machine is toppled and fall, and it also can keep the flowing amount of the mist in the aromatherapy machine stable when the aromatherapy machine is in using state.

9 Claims, 8 Drawing Sheets

(56) References Cited

U.S. PATENT DOCUMENTS

| | | | |
|---|---|---|---|
| 2016/0193434 A1* | 7/2016 | Gleixner | A61M 15/0066 |
| | | | 128/200.14 |
| 2017/0064997 A1* | 3/2017 | Murison | A24F 40/53 |
| 2022/0219190 A1* | 7/2022 | Wang | B05B 7/0012 |
| 2024/0042474 A1* | 2/2024 | Okaguchi | A61M 11/005 |
| 2024/0238554 A1* | 7/2024 | Zou | A61M 11/042 |

\* cited by examiner

OIL LEAKING PREVENTION STRUCTURE AND AROMATHERAPY MACHINE WITH THE SAME

FIELD OF THE INVENTION

The present invention relates to the technical field of aromatherapy machine, more particularly, to an oil leaking prevention structure and an aromatherapy machine with the same.

BACKGROUND OF THE INVENTION

As the increase of income level, more and more people begin to pursue comfortable living space, adding ornaments or articles for foiling atmosphere in the living bedroom. Aromatherapy machines as a device can change the indoor atmosphere, and improve the odor in the space, are broadly loved by people. The initial aromatherapy machines are large, mainly used in indoor places such as hotels, bedrooms and lobbies. As more and more brand car enterprises launch models with aromatherapy systems, people become interested in improving atmosphere inside a car through aromatherapy. In the car without the aromatherapy system, people adopt aromatherapy machines to achieve the role of aromatherapy. The aromatherapy machines forms mist by aromatherapy oils, spreading into air to improve the indoor atmosphere. The aromatherapy machines equipped with liquid aromatherapy oils will be toppled and fallen by external force so that the aromatherapy oils will be leakage, which is corrosive to the car interior, damaging the car interior.

In order to overcome the deficiencies, Chinese Utility Model Patent No.: ZL201921251007.5 discloses an oil leaking prevention structure of aromatherapy device, which is provided with a leakage prevention assembly in an atomizing chamber, the leakage prevention assembly can make the atomizing chamber be communicated with an overflow port of the aromatherapy device when the essential oil bottle is in an upright condition, and can block the atomizing chamber and overflow port of the aromatherapy device in time when the essential oil bottle is titled or inverted, thereby preventing the essential oil in the essential oil bottle from leaking and waste. When the aromatherapy device is used in normal, the leakage prevention assembly can make the atomizing chamber be communicated with an overflow port of the aromatherapy device, thereby spreading the essential oil into air.

However, when the oil leaking prevention structure is used in normal, the aromatherapy mist can spread out around the steel ball, affect the spray effect of aromatherapy mist, and when the aromatherapy device is topple and fall, the gap between the steel ball and the spraying port under long time will increase, which will affect the spray effect.

SUMMARY OF THE INVENTION

An aim of the present invention is to solve the technical problems that "when the oil leaking prevention structure is used in normal, the aromatherapy mist can spread out around the steel ball, affect the spray effect of aromatherapy mist, and when the aromatherapy device is topple and fall, the gap between the steel ball and the spraying port under long time will increase, which will affect the spray effect." Therefor, the present invention provides an oil leaking prevention structure and an aromatherapy machine with the same, which can prevent the essential oil in the aromatherapy machine from leaking effectively when the aromatherapy machine is topple and fall, and in working state, it can keep the same spraying amount in the spraying port, improving the spraying effect.

According to some embodiments in the present invention, an oil leaking prevention structure, used in an aromatherapy machine which includes a spraying port and a liquid reservoir, includes a rectifying chamber arranged in the aromatherapy machine, one side of the rectifying chamber communicates with the spraying port, another side of the rectifying chamber communicates with the liquid reservoir, some essential oil is stored in the liquid reservoir and is atomized into mist, the mist enters the rectifying chamber and is ejected from the spraying port.

Wherein, the rectifying chamber includes a rectifying portion and a leak-proof portion, the rectifying portion is disposed at a side of the spraying port, the leak-proof portion is disposed between the spraying port and the rectifying portion, the rectifying portion communicates with the leak-proof portion to stabilize the flowing amount of the mist ejected from the rectifying chamber. The leak-proof portion is used for preventing the essential oil from leaking from the spraying port when the liquid reservoir is topple and fall, when the liquid reservoir is topple and fall, the leak-proof portion blocks the spraying port.

According to some embodiments in the present invention, the leak-proof portion includes a leak-proof tube, one end thereof communicates with the spraying port, the other end is connected with the bottom of the rectifying portion. The sidewall of the leak-proof tube adopts a hollowed-out structure, adopts a hollowed-out structure, the mist in rectifying chamber enters the leak-proof tube from the hollowed-out structure; the bottom of the rectifying portion also adopts the other hollowed-out structure, the essential oil in the liquid reservoir enters the rectifying chamber from the other hollowed-out structure.

According to some embodiments in the present invention, a steel ball is disposed in the leak-proof tube, the diameter of the steel ball is not less than that of the leak-proof tube.

According to some embodiments in the present invention, the bottom of the rectifying portion is provided with a hole at a corresponding position to the leak-proof tube, but the hole is off-center at the bottom. When the steel ball contacts with the rectifying portion, it contacts the centre of the bottom of the rectifying portion, the hole communicates with the leak-proof tube.

According to some embodiments in the present invention, the rectifying portion is a recessing structure, the middle of the rectifying portion is recessed towards the liquid reservoir so that the essential oil in the rectifying chamber reflow into the liquid reservoir.

According to some embodiments in the present invention, the leak-proof portion includes an elastic ring arranged at a side of the leak-proof tube close to the spraying port, one side of the elastic ring is connected with the spraying port, the other side thereof is horn-shaped and contacts with the steel ball elastically, however when the steel ball and the elastic ring contacts, the rectifying chamber is separated from the spraying port so as to prevent the essential oil from leaking from the spraying port.

According to some embodiments in the present invention, the side wall of the leak-proof tube close to the elastic ring is provided with a limited portion for the steel ball, the limited portion is disposed around the inner wall of the leak-proof tube. When the steel ball and the elastic ring contacts, the limited portion limits the position of the steel ball and defines a deformation degree of the elastic ring.

According to some embodiments in the present invention, the aromatherapy machine includes the above oil leak prevention structure, a shell and a pump mechanism disposed in the shell and communicated with the liquid reservoir, the pump mechanism is used for atomizing the essential oil in the liquid reservoir, a leak-proof ring is disposed between the rectifying chamber and the liquid reservoir, the leak-proof ring is used for preventing the essential oil in the liquid reservoir from leaking from a gap.

According to some embodiments in the present invention, the rectifying chamber, the liquid reservoir and the shell are detachably connected, the rectifying chamber and the liquid reservoir are inserted into the shell from a top of the shell, the side wall of the rectifying chamber is provided with a guiding slot, a side wall of the shell around the rectifying chamber is provided with a guiding block, the guiding slot and the guiding block are slid connected, the guiding slot and the guiding block are used for aligning the gas channel between the rectifying chamber and the pump mechanism.

According to some embodiments in the present invention, the rectifying chamber is provided with a connecting tube, one side of the connecting tube communicates with the pump mechanism, the other side of the connecting tube communicates with the delivering hose, the delivering hose extends into the essential oil in the liquid reservoir. The end section of the delivering hose is V-shaped. A leak-proof base is disposed between the pump mechanism and the connecting tube, the leak-proof base provides better air tightness between the pump mechanism and the connecting tube, and prevents air leakage. The connecting tube includes an inlet tube and an oil outlet tube, one end of the inlet tube communicates with the pump mechanism, the other end thereof is provided with an increasing pressure hole. One end of the oil outlet tube enters the liquid reservoir, the other end thereof is provided with a positive pressure hole, the increasing pressure hole and the positive pressure hole are close to each other, the pore size of the positive pressure hole is gradually narrowed from a side close to the oil outlet tube to a side away from the oil outlet tube.

According to some embodiments in the present invention, the oil leaking prevention structure and an aromatherapy machine with the same at least has the following advantages: The hole of the rectifying portion communicates with the leak-proof portion, the bottom of the rectifying portion is also communicated with the side wall of the leak-proof portion, the leak-proof portion has the role of preventing leakage when the aromatherapy machine is toppled and fall, and it also can keep the flowing amount of the mist in the aromatherapy machine stable when the aromatherapy machine is in using state.

Additional aspects and advantages of the present invention will be given in the following description section, which will become apparent from the following description, or are understood through the practice of the present invention.

BRIEF DESCRIPTION OF THE DRAWINGS

The above-described and/or additional aspects and advantages of the present invention will become apparent and easily understood from the description of the embodiment in combination with the following drawings, wherein.

DETAILED DESCRIPTION OF ILLUSTRATED EMBODIMENTS

In order to make the invention purpose, the technical scheme and the technical effect more clearly be understood, the invention is further explained in combination with the concrete embodiment below. It should be understood that the specific embodiments described herein are only used to interpret the invention and are not used to limit the invention.

Referring to FIG. 1-10, the present invention provides an oil leaking prevention structure and an aromatherapy machine with the same.

Referring to FIG. 1, FIG. 2, FIG. 4 and FIG. 8, the oil leaking prevention structure is mainly used in the aromatherapy machine in car or in room, the aromatherapy machine includes the spraying port 110 and the liquid reservoir 120. Specifically, the oil leaking prevention structure includes a rectifying chamber 200 arranged in the aromatherapy machine, one side of the rectifying chamber 200 communicates with the spraying port 110, another side of the rectifying chamber 200 communicates with the liquid reservoir 120. Some essential oil is stored in the liquid reservoir 120 and atomized into mist. The mist enters the rectifying chamber 200 and is ejected from the spraying port 110. The rectifying chamber 200 can reduce the flowing rate of the mist and make it flow evenly, and keeps the flowing amount of the mist stable when it is ejected from spraying port 110, thereby improving the fluency of atomization and improving the user's experience.

Figure 4:
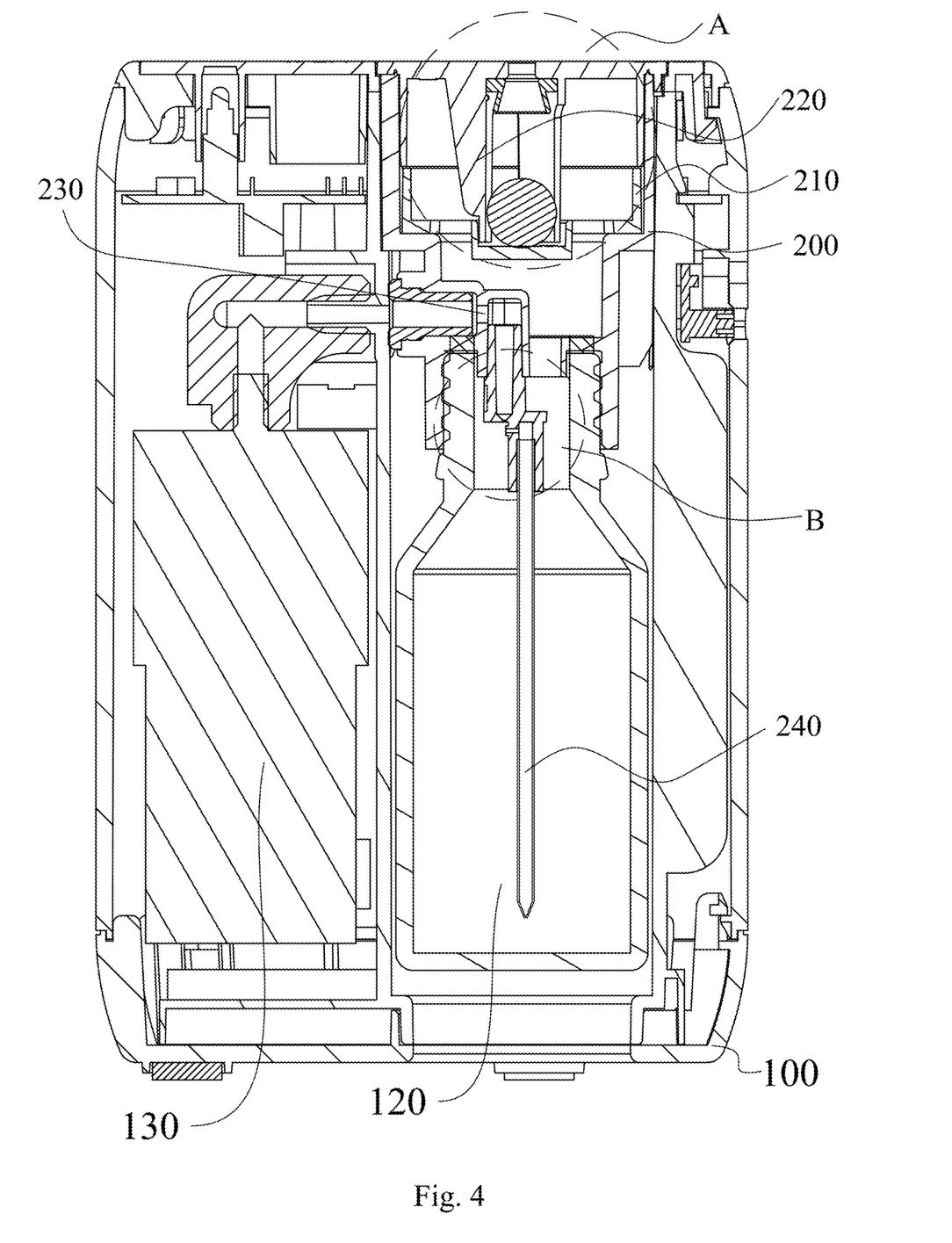
FIG. 4 is an in-section view of FIG. 3 along the A-A line.
Figure 5:
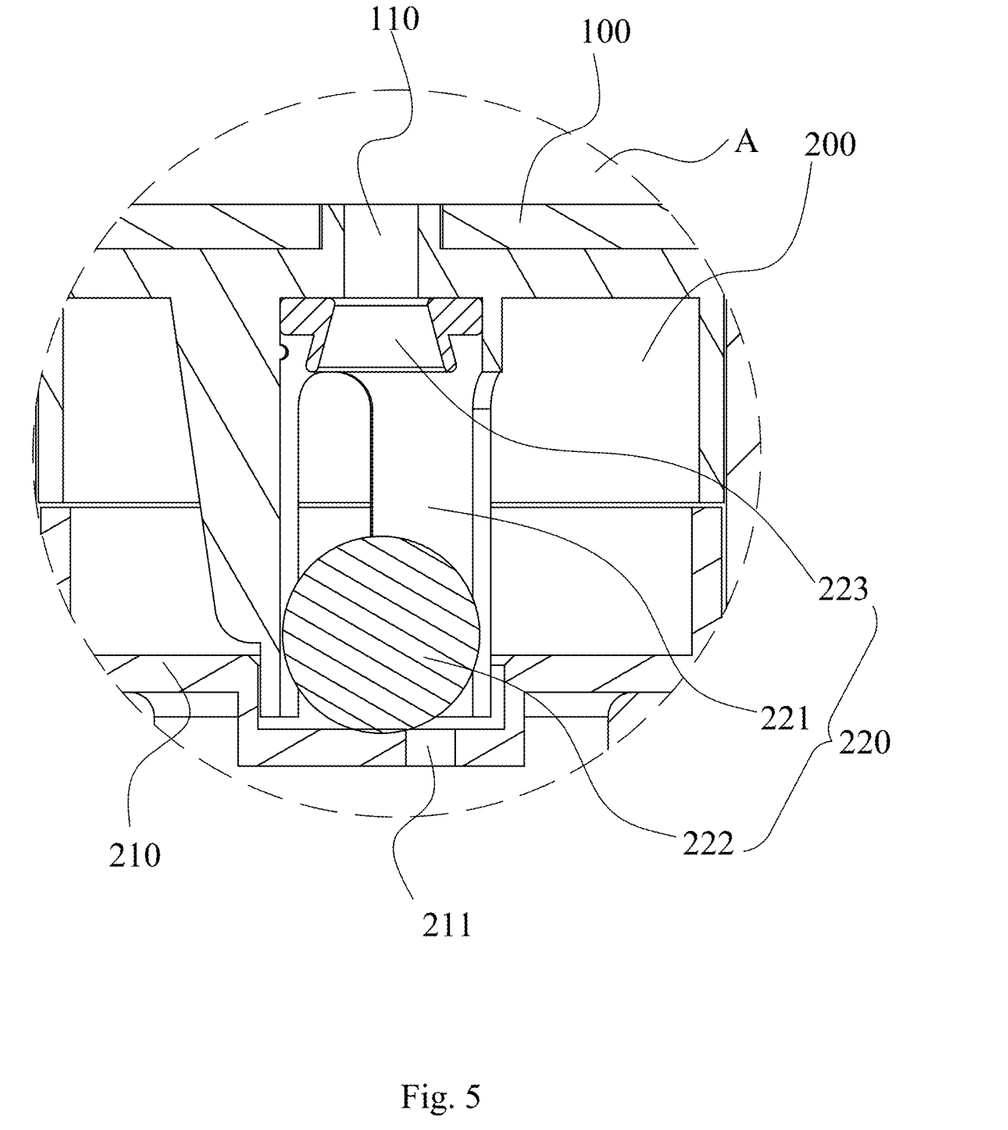
FIG. 5 is an enlarged view of part A in FIG. 4.
Figure 8:
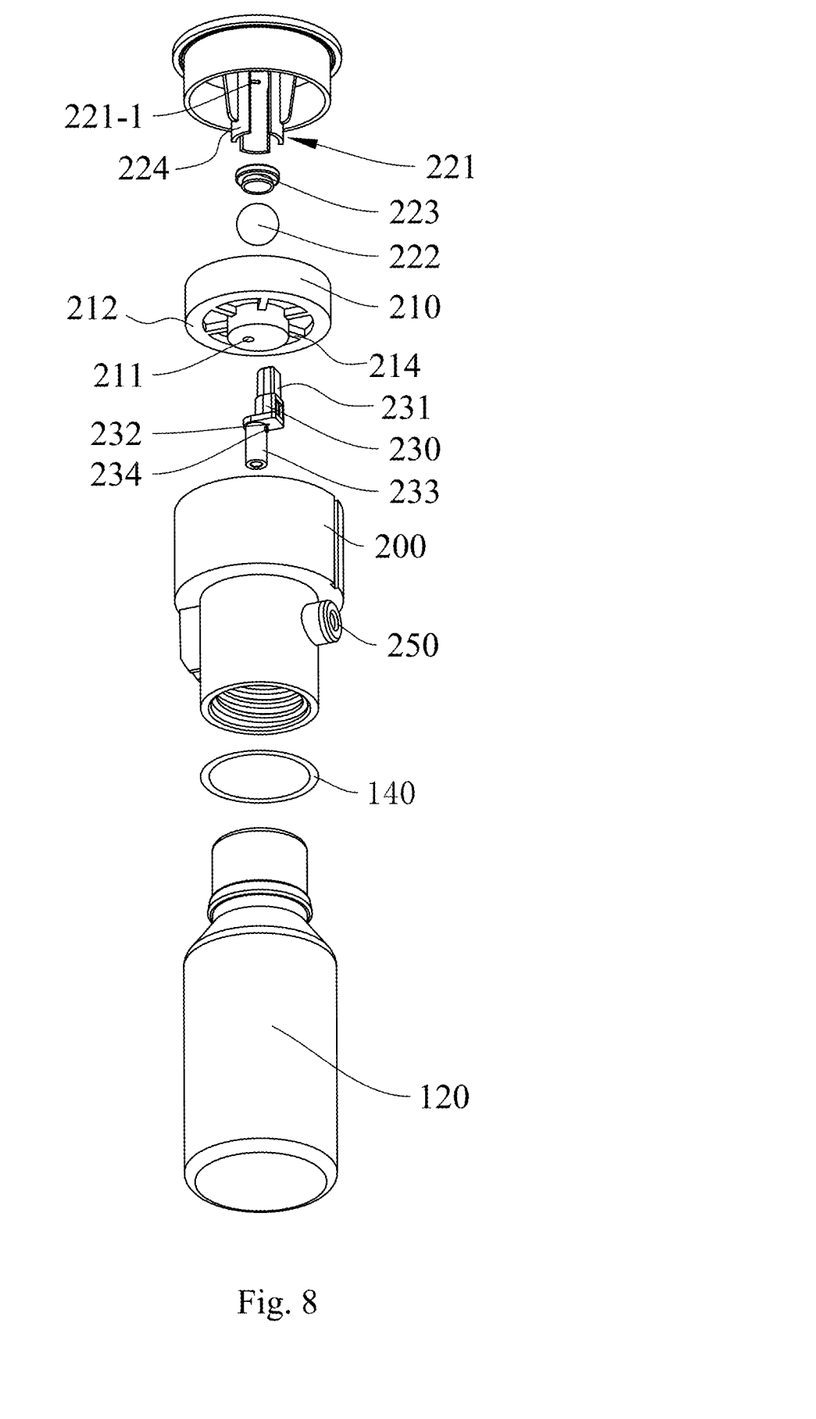
FIG. 8 is a decomposition view of the oil leaking prevention structure according to the embodiments in the present invention.

Referring to FIG. 4, FIG. 5 and FIG. 8, the rectifying chamber 200 contains a rectifying portion 210 and a leak-proof portion 220, the rectifying portion 210 is disposed at a side of the spraying port 110. When the mist enters the rectifying chamber 200, it enters the rectifying portion 210 firstly. The leak-proof portion 220 is disposed between the spraying port 110 and the rectifying portion 210. Specifically, the rectifying chamber 200 communicates with the leak-proof portion 220, which ensures that the mist in the rectifying chamber 200 can enter the leak-proof portion 220 and is ejected from the spraying port 110, and avoids the leak-proof portion 220 from affecting the flowing amount of the mist. The rectifying portion 210 communicates with the leak-proof portion 220, a part of the mist in the liquid reservoir 120 can enter the leak-proof portion 220 directly by passing through the rectifying portion 210 and is ejected from the spraying port 110. The two flowing paths of the mist ensures the mist at the spraying port 110 to keep stable flowing rate at any time, thereby stabilizing the flowing amount of the mist ejected from the spraying port 110.

The leak-proof portion 220 is also used for preventing the essential oil from leaking from the spraying port 110 when the liquid reservoir 120 is topple and fall.

When the aromatherapy machine is topple and fall, the essential oil in the liquid reservoir 120 will enter the rectifying chamber 200, at this time, the leak-proof portion 220 can block the spraying port 110 and avoid the essential oil from flowing out from the spraying port 110. The leak-proof portion 220 in the present invention can keep the flowing rate of the mist in the spraying port 110 consistent while ensuring the leakage proof function, which ensures the incense effect and the user's experience. Compared with the oil leaking prevention structure disclosed in Chinese Utility Model Patent No.: ZL201921251007.5, the oil leaking prevention structure of aromatherapy machine in present invention has better leakage proof effect and better user's experience.

In some embodiments, referring to FIG. 4, FIG. 5 and FIG. 8, the leak-proof portion 220 includes a leak-proof tube 221, one end thereof communicates with the spraying port 110, the other end thereof is connected with a centre of a bottom 212 of the rectifying portion 210. The sidewall 224 of the leak-proof tube 221 adopts a hollowed-out structure, where slots divide the sidewall into several independent segments, and the mist in rectifying chamber 200 enters the leak-proof tube 221 from the hollowed-out structure. The bottom 212 of the rectifying portion 210 also adopts the other hollowed-out structure 214, the essential oil in the liquid reservoir 120 enters the rectifying chamber 200 from the other hollowed-out structure 214.

In some embodiments, referring to FIG. 4, FIG. 5 and FIG. 8, a steel ball 222 is disposed in the leak-proof tube 221, the diameter of the steel ball 222 is not less than that of the spraying port 110. Specifically, the steel ball 222 is limited to move in the leak-proof tube 221. When the steel ball 222 rolls in the leak-proof tube 221, the leak-proof tube 221 communicates with the rectifying chamber 200 through the hollowed-out structure of the leak-proof tube 221, the rolling of the steel ball 222 does not affect the mist to enter the leak-proof tube 221 from the hollowed-out structure. The steel ball 222 rolls in the leak-proof tube 221 under the control of the gravity, when the aromatherapy machine is toppled and fall, the steel ball 222 moves toward the spraying port 110 under the function of the gravity and blocks the spraying port 110 so that the mist can not be ejected from the spraying port 110. That the diameter of the steel ball 222 is not less than that of the leak-proof tube 221 also can prevent the steel ball 222 from rolling out of the leak-proof tube 221 a to enter the rectifying chamber 200.

It should be understood that the diameter of the steel ball 222 is not less than that of the leak-proof tube 221 is not the only implementation, in some other embodiment, the diameter of the steel ball 222 is bigger than that of the leak-proof tube 221, and the diameter of the steel ball 222 is bigger than that of the hollowed-out structure of the leak-proof tube 221, thereby ensuring the steel ball 222 is limited to active in the leak-proof tube 221. The present invention does not limit the diameter specifications of the leak-proof tube 221. Without leaving the basic idea of the present invention, the change of the diameter specifications of the steel ball 222 should be deemed to be within the protection scope defined by the present invention.

Specifically, the steel ball 222 is made from stainless steel, it should be understood that, the steel ball 222 using stainless steel material is not the only implementation, in some other embodiments, the steel ball 222 has an internal metal covered by fluorine adhesive layer (i. e. fluorine rubber), which ensures that the steel ball 222 has a certain mass and can roll under gravity. The structure and the materials of the steel ball 222 are not limited herein, it should be understood that without leaving the basic idea of the present invention, the change of the structure and the materials of the steel ball 222 should be deemed to be within the protection scope defined by the present invention.

In some embodiments, referring to FIG. 4, FIG. 5 and FIG. 8, the bottom 212 of the rectifying portion 210 is provided with a hole 211 at a corresponding position to the leak-proof tube 221, but the hole 211 is off-center of the bottom. Specifically, the hole 211 communicates with the leak-proof tube 221, the mist in the liquid reservoir 120 also can enter the leak-proof tube 221 from the hole 211 except entering the rectifying chamber 200 from the other hollowed-out structure 214 of the rectifying portion 210.

When the steel ball 222 contacts with the rectifying portion 210, it contacts the centre of the bottom 212 of the rectifying portion 210, the hole 211 communicates with the leak-proof tube 221. The hole 211 in the bottom 212 of the rectifying portion 210 is arranged at an off-center position thereof. When the aromatherapy machine work normally, the steel ball 222 is located at the bottom of the leak-proof tube 22, that is to say that the steel ball 222 is attached to the bottom 212 of the rectifying chamber 210, but does not block the hole 211. At this time, the a part of the mist in the liquid reservoir 120 enters the leak-proof tube 221 from the hole 211, after the mist touches the steel ball 222, it moves along a gap between the steel ball 222 and the leak-proof tube 221 toward the spray port 110. The hole 211 provides one more flowing path, and assists the flow amount of the mist of the spraying port 110 consistent to ensure the quality of the spraying mist. When the mist enters the leak-proof tube 221 from the hole 211 and touches the steel ball 222, the mist also can lubricate the steel ball 222, ensuring that the steel ball 222 rolls smoothly in the leak-proof tube 221, and ensuring that the steel ball 222 can still fit with the spray port 110 after it is used for along time, and ensuring the leakage prevention effect.

In some embodiments, referring to FIG. 4, FIG. 5 and FIG. 8, the rectifying portion 210 is a recessing structure, that is the middle of the rectifying portion 210 is recessed towards the liquid reservoir 120 so that the essential oil in the rectifying chamber 200 reflow into the liquid reservoir 120. Specifically, the bottom 212 of the rectifying portion 210 is flat and the middle thereof is concave toward the liquid reservoir 120. When the mist is liquid accumulation in the rectifying chamber 200, the liquid accumulation can gather at the recessing structure, then reflow into the liquid reservoir 120 from the hole 211, for atomization again.

In some embodiments, referring to FIG. 4, FIG. 5 and FIG. 8, the leak-proof portion 220 includes an elastic ring 223 arranged at a side of the leak-proof tube 221 close to the spraying port 110, one side of the elastic ring 223 is connected with the spraying port 110, the other side thereof is horn-shaped and contacts with the steel ball 222 elastically. However when the steel ball 222 and the elastic ring 223 contacts, the rectifying chamber 200 is separated from the spraying port 110 so as to prevent the essential oil in the liquid reservoir 120 from leaking from the spraying port 110. Specifically, the elastic ring 223 is horn-shaped, the diameter of the elastic ring 223 is bigger than that of the steel ball 222. And the elastic ring 223 is made from fluorine rubber or butyl fine rubber, which has good corrosion resistance to the essential oil, which can avoid increasing the gap between the elastic ring 223 and the steel ball 222 after being used for a long time, and ensure the oil leakage sealing performance of the elastic ring 223.

Specifically, compared with Chinese Utility Model Patent No.: ZL201921251007.5, which discloses oil leaking prevention structure, the steel ball directly contacts with the spraying port 110. As the increase of service time, the aging of spraying port 110 is easy to cause cracks in the blocking state. While in the embodiments in the present invention, the elastic ring 223 as a medium between the spraying port 110 and the steel ball 222, the steel ball 222 contacts the elastic leak ring 223 to enable sealing of the spraying port 110. The elastic ring 223 is made from fluorine rubber or butyl fine rubber, which has good corrosion resistance to the essential oil, which can avoid the oil leakage sealing performance of the elastic ring 223 from reducing. The essential oil at the surface of the steel ball 222 can lubricate the steel ball 222, keep the elasticity of the elastic leakage ring 223 for a long time and not easy to age.

In some embodiments, referring to FIG. 4, FIG. 5 and FIG. 8, the sidewall 224 of the leak-proof tube 221 close to the elastic ring 223 is provided with a limited portion 221-1 for the steel ball, the limited portion 221-1 is disposed around the inner wall of the leak-proof tube 221. When the steel ball 222 and the elastic ring 223 contacts, the limited portion 221-1 limits the steel ball 222 and defines a deformation degree of the elastic ring 223.

Specifically, the steel ball 222 contacts the elastic ring 223 to deform it, when the steel ball 222 compresses the limited portion 221-1, the maximum stroke of the steel ball 222 is reached, at this time, the elastic ring 223 reaches the optimal deformation, the limited portion 221-1 prevents the deformation of the elastic ring from becoming too large and causes the steel ball 222 to be unable to fall back when the aromatherapy machine is placed upright.

In some embodiments, referring to FIG. 1-4, FIG. 8 and FIG. 9, the aromatherapy machine includes the above oil leak prevention structure, a shell 100 and a pump mechanism 130 disposed in the shell 100. The pump mechanism 130 is wrapped with by materials such as cotton and velvet cloth that can reduce the noise and reduce the working noise of the pump mechanism 130. The pump mechanism 130 communicates with the liquid reservoir 120, the pump mechanism 130 is used for atomizing the essential oil in the liquid reservoir 120.

Referring to FIG. 8, a leak-proof ring 140 is disposed between the rectifying chamber 200 and the liquid reservoir 120, the leak-proof ring 140 is used for preventing the essential oil in the liquid reservoir 120 from leaking from a connection gap. Specifically, the elastic ring 223 is made from fluorine rubber or butyl fine rubber, which has good corrosion resistance to the essential oil and can avoid the oil leakage sealing performance of the elastic ring 223 from reducing.

Figure 1:
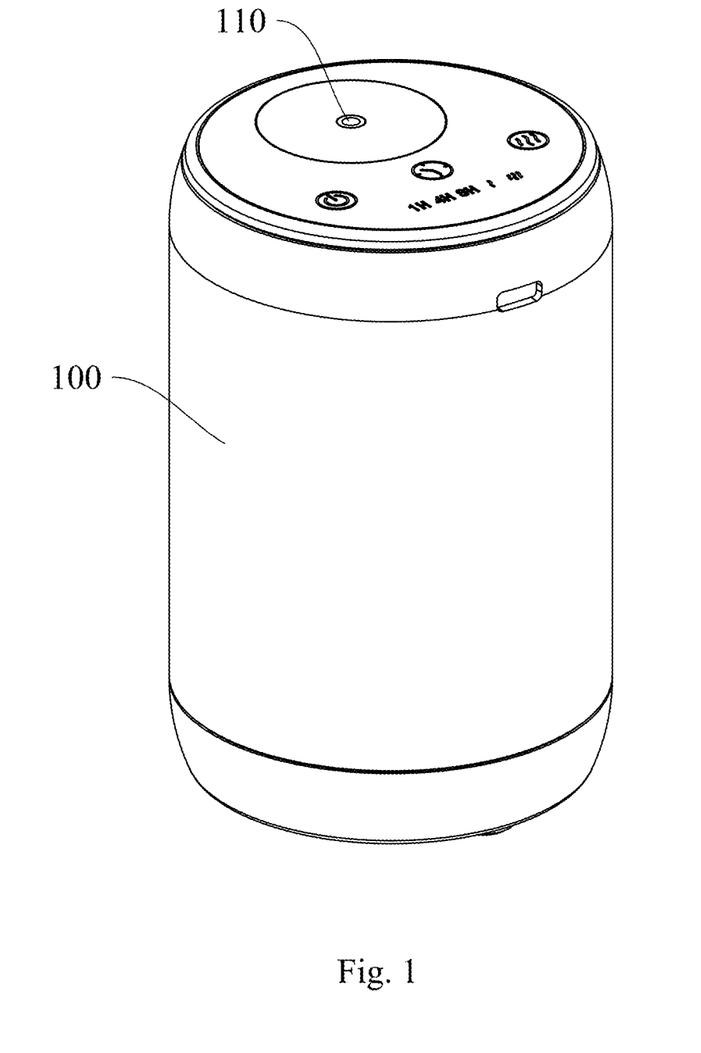
FIG. 1 is a perspective view of the aromatherapy machine and the aromatherapy machine according to the embodiments in the present invention.
Figure 2:
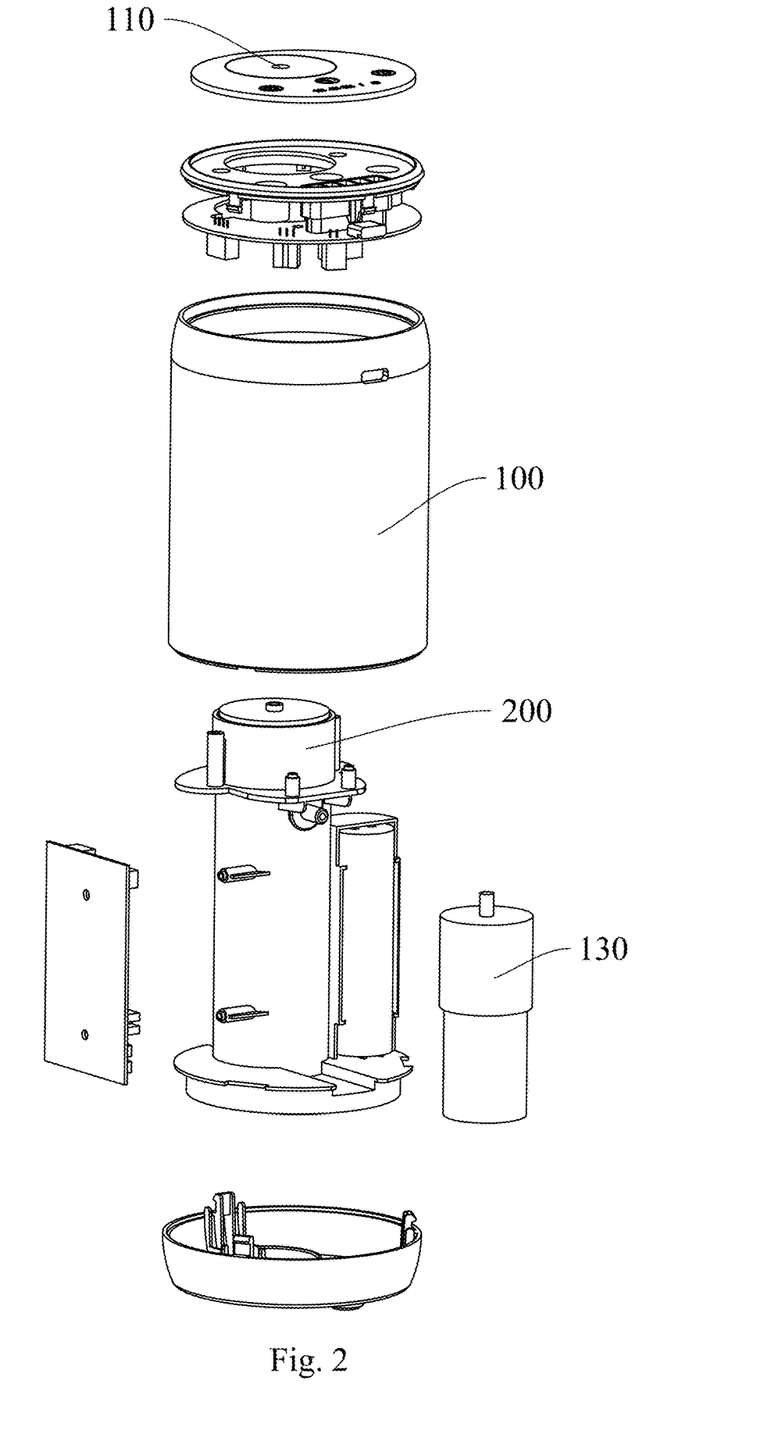
FIG. 2 is an explode view of the aromatherapy machine and the aromatherapy machine with the same according to the embodiments in the present invention.
Figure 3:
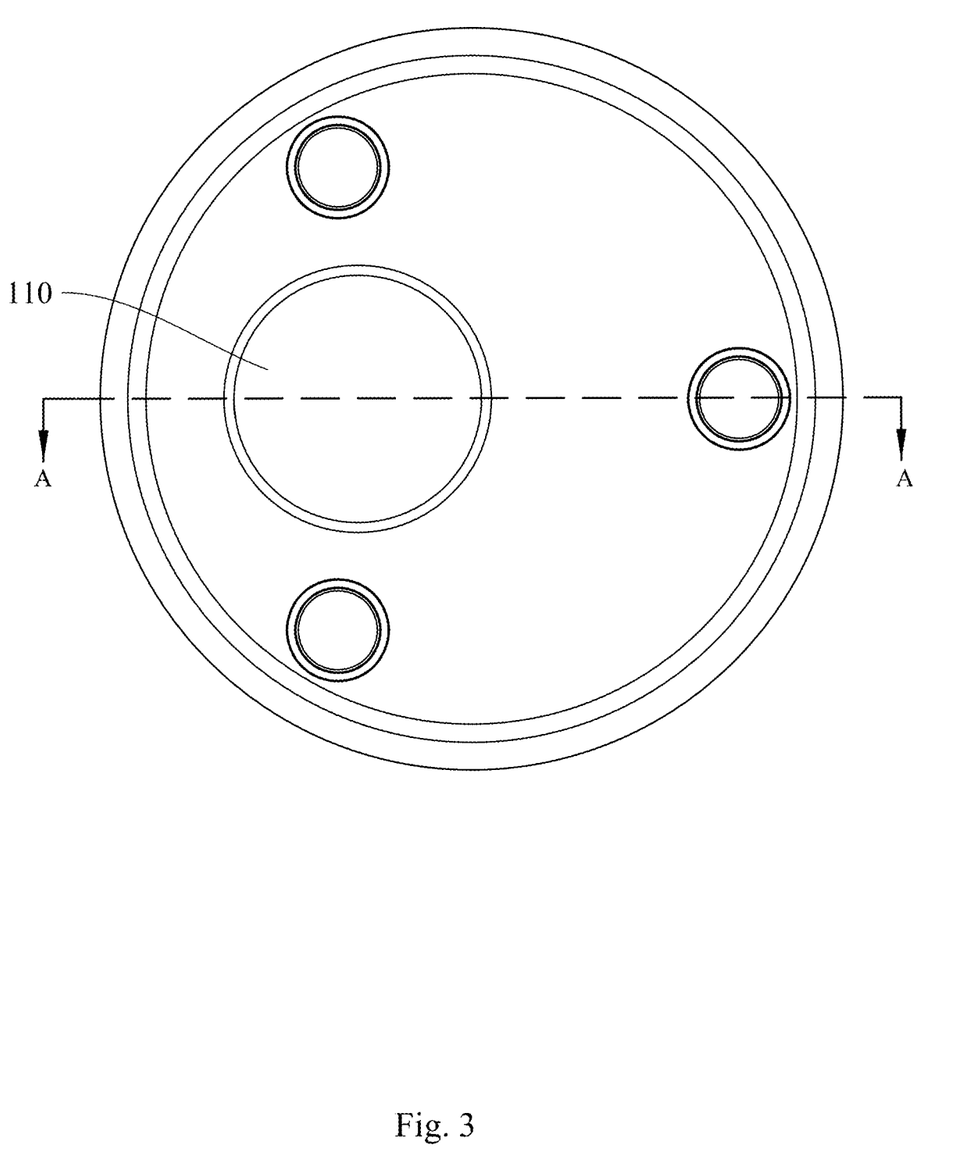
FIG. 3 is a top view of the aromatherapy machine according to the embodiments in the present invention.

In some other embodiments, referring to FIG. 1, FIG. 2 and FIG. 8, the rectifying chamber 200, the liquid reservoir 120 and the shell 100 are detachably connected, the rectifying chamber 200 and the liquid reservoir 120 are inserted into the shell 100 from a top of the shell 10. When the liquid reservoir 120 needs to be replaced, the liquid reservoir 120 is pushed inward from a slot at the bottom of the housing shell 100 corresponding to the liquid reservoir 120, so that the liquid reservoir 120 and the rectifying chamber 200 rise from the top of the shell 100.

Figure 9:
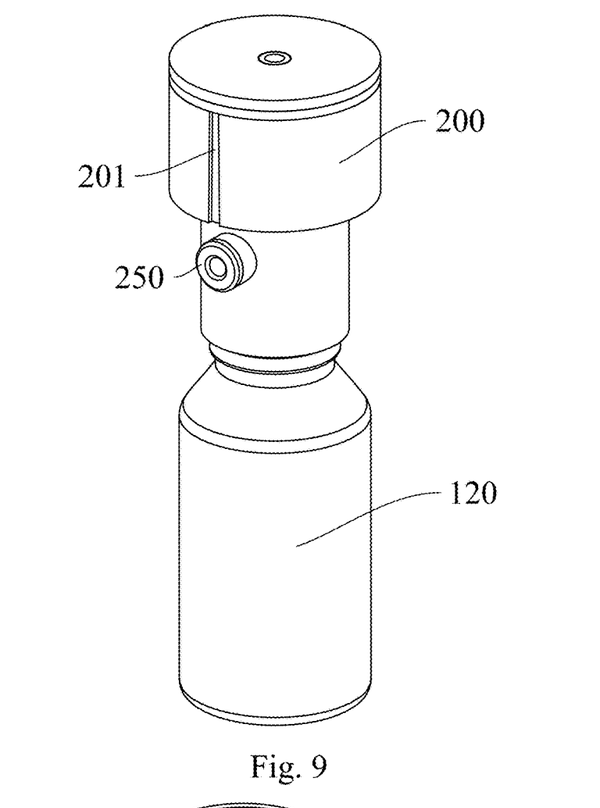
FIG. 9 is a perspective view of the oil leaking prevention structure according to the embodiments in the present invention.
Figure 10:
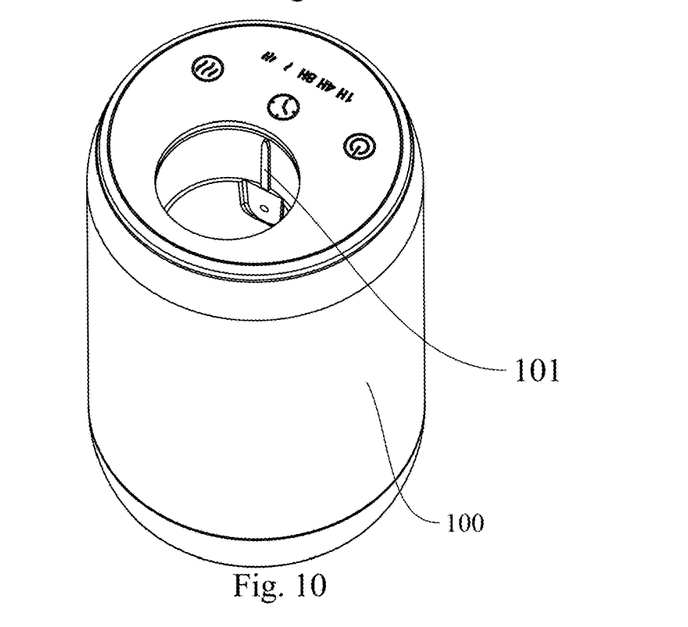
FIG. 10 a decomposition view of the aromatherapy machine according to the embodiments in the present invention.

Referring to FIG. 8 and FIG. 9, the sidewall of the rectifying chamber 200 is provided with a guiding slot 201, a sidewall of the shell around the rectifying chamber 200 is provided with a guiding block 101, the guiding slot 201 and the guiding block 101 are slid connected, the guiding slot 201 and the guiding block 101 are used for aligning the gas channel between the rectifying chamber 200 and the pump mechanism 130. The guiding slot 201 and the guiding block 101 enable the user to better align assembly positions of the rectifying chamber 200 in the shell 100 after replacing the liquid reservoir 120, ensuring that the rectifying chamber 200 is fully connected with the air channel between the pump mechanism 130 and ensuring the intake air volume.

Figure 6:
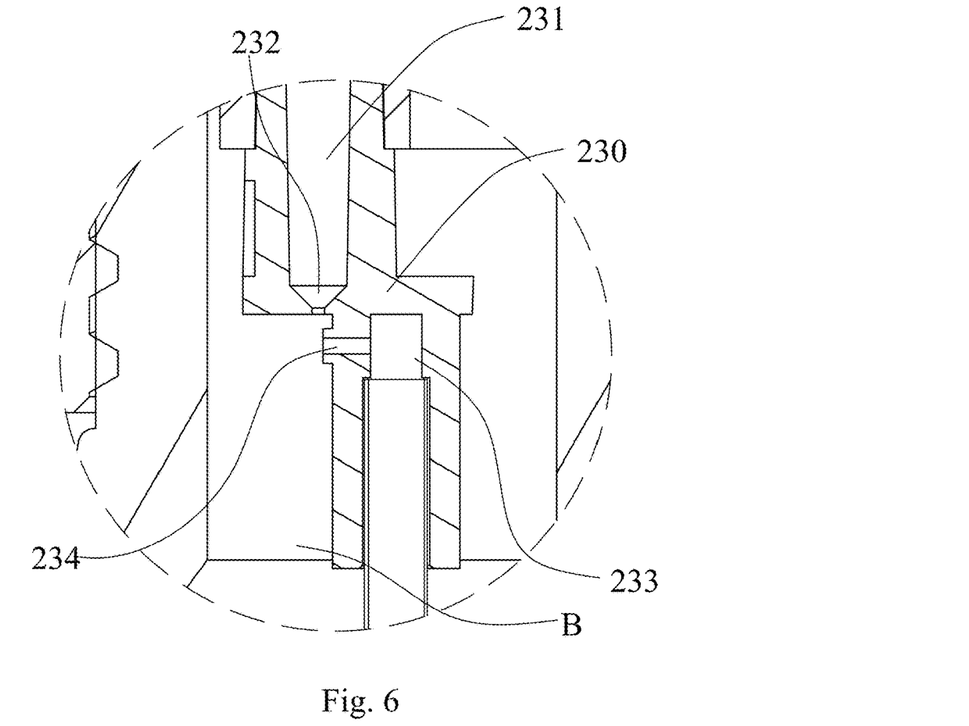
FIG. 6 is an enlarged view of part B in FIG. 4.
Figure 7:
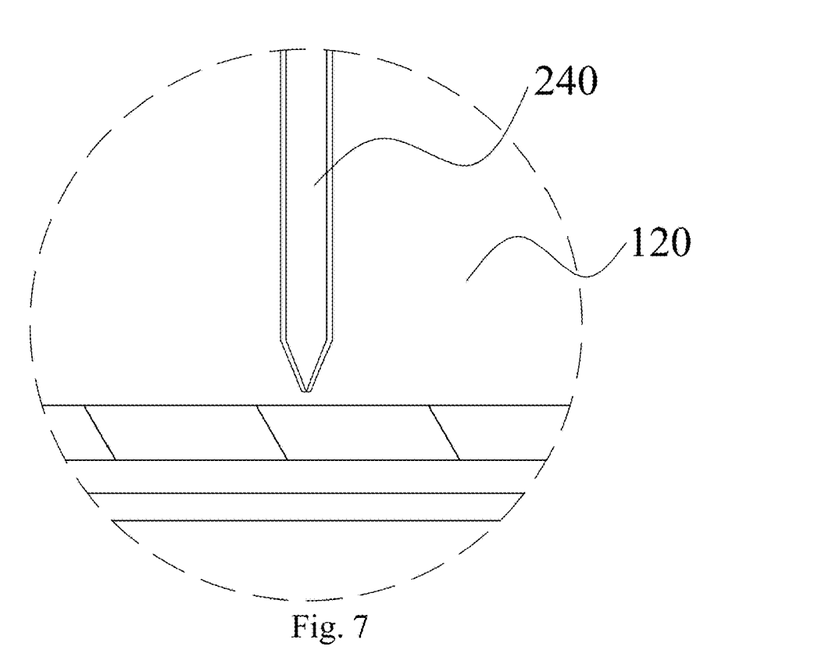
FIG. 7 is an enlarged view of part C in FIG. 4.

In some other embodiments, referring to FIG. 4, FIG. 6 and FIG. 7, the rectifying chamber 200 is provided with a connecting tube 230, one side of the connecting tube 230 communicates with the pump mechanism 130, the other side of the connecting tube 230 communicates with the delivering hose 240, and the delivering hose 240 extends into the essential oil in the liquid reservoir 120. The connecting tube 230 is made of polypropylene (PP), which has good corrosion resistance to essential essential oil and ensures the service life of the atomized connection pipe 230.

Specifically, the connecting tube 230 and the rectifying chamber 200 are connected by plugging and pulling ways, which is convenient for users to disassemble the connecting tube 230 and clean it. Compared with a threaded connection, the plugging and pulling ways in the present invention can pull the connecting tube 230 directly, which is faster.

Referring to FIG. 7, the end section of the delivering hose 240 is V-shaped, that is two sides of the end of the delivering hose 240 is open. When the end of the delivering hose 240 is attached to the bottom of the liquid reservoir 120, the essential oil in the liquid reservoir 120 can enter the delivering hose 240 from the two sides of the end thereof, which prevents the delivering hose 240 from being blocked by the sidewall of the liquid reservoir 120, resulting in the essential oil can not be extracted.

Referring to FIG. 8 and FIG. 9, a leak-proof base 250 is disposed between the pump mechanism 130 and the connecting tube 230, the leak-proof base 250 provides better air tightness between the pump mechanism 130 and the connecting tube 230, and prevents air leakage. When the rectifying chamber 200 inserts into the shell 100 and cooperates with it, the inlet port of the rectifying chamber 200 and the outlet port of the pump mechanism 130 are aligned, the leak-proof base 250 is arranged at the joints of the rectifying chamber 200 and the pump mechanism 130 to effectively fill the gap therebetween, making air tightness between the air pump mechanism 130 and the rectifier cavity 200 better.

Referring to FIG. 4 and FIG. 6, the connecting tube 230 includes an inlet tube 231 and an oil outlet tube 233, one end of the inlet tube 231 communicates with the pump mechanism 130, the other end thereof is provided with an increasing pressure hole 232. One end of the oil outlet tube 233 enters the essential oil in the liquid reservoir 130, the other end thereof is provided with a positive pressure hole 234, the increasing pressure hole 232 and the positive pressure hole 234 are close to each other. Referring to FIG. 6, the pore size of the positive pressure hole 234 is gradually narrowed from a side close to the oil outlet tube 233 to a side away from the oil outlet tube 233. It can make the essential oil spray faster from the positive pressure hole 234, reduce the flow amount, thereby making the essential oil better contact with the high-speed airflow and atomize.

Referring to FIG. 4 and FIG. 7, the delivering hose 240 and the oil outlet tube 233 are connected by an inner plugging way, that is the delivering hose 240 inserts into the oil outlet tube 233, which can effectively prevent air leakage at the joins of the oil outlet tube 233 and the delivering hose 240. In some other embodiments, it may be possible that the delivering hose 240 surrounds the oil outlet tube 233 to make the two more closely connect.

Specifically, the pore size of the increasing pressure hole 232 is gradually narrowed to increase the gas flow rate in the increasing pressure hole 232 to blow away the air near the positive pressure bore 234. At this time, a side of the positive pressure hole 234, blown away the air, is in a low pressure state, and the side of the positive pressure hole 234, connected to the oil outlet tube 233, communicates with the essential oil in the liquid reservoir 120. A pressure of the liquid surface of the essential oil causes the essential oil to enter the oil outlet tube 233 through the delivering hose 240 and then be ejected through the positive pressure hole 234. The essential oil ejected from the positive pressure hole 234 meets the gas from the increasing pressure hole 232, causing the essential oil to atomize into the mist.

In the description of this specification, the descriptions referring to the terms "one embodiment", "some embodiments", "schematic embodiment", "examples", "specific examples", or "the specific features", means structure, material, or features described in combination with the embodiment or example, which are included in at least one embodiment or example of the present invention. In this specification, a schematic representation of the above terms does not necessarily refer to the same embodiments or examples. Moreover, the specific features, structures, or materials described may be combined in an suitable manner in any one or more embodiments or examples.

Although embodiments of the present invention have been shown and described, one of ordinary skill in the art may understand that the multiple changes, modifications, replacement, and variations of these embodiments may be made without departing from the principles and purposes of the present invention, and the scope of the present invention is defined by the claims and the equivalent thereof.

What is claimed is:

1. An oil leaking prevention structure, used in an aromatherapy machine having a spraying port and a liquid reservoir, comprising:
    a rectifying chamber, arranged in said aromatherapy machine, one side of said rectifying chamber communicates with said spraying port, another side of said rectifying chamber communicates with said liquid reservoir, some essential oil is stored in said liquid reservoir and is atomized into mist, said mist enters said rectifying chamber and is ejected from said spraying port;
    wherein, said rectifying chamber includes a rectifying portion and a leak-proof portion, said rectifying portion is disposed at a side of said spraying port, said leak-proof portion is disposed between said spraying port and said rectifying portion, said rectifying portion communicates with said leak-proof portion to stabilize a flowing amount of said mist ejected from said rectifying chamber; said leak-proof portion is used for preventing said essential oil from leaking from said spraying port when said liquid reservoir topples and falls, when said liquid reservoir topples and falls, said leak-proof portion blocks said spraying port;
    said leak-proof portion includes a leak-proof tube, one end of said leak-proof tube communicates with said spraying port, another end of said leak-proof tube is connected with a bottom of said rectifying portion; a sidewall of said leak-proof tube adopts a hollowed-out structure, where slots divide the sidewall into several independent segments; said mist in said rectifying chamber enters said leak-proof tube from said hollowed-out structure; said bottom of said rectifying portion adopts another hollowed-out structure, said essential oil in said liquid reservoir enters said rectifying chamber from said another hollowed-out structure.

2. The oil leaking prevention structure according to claim 1, wherein a steel ball is disposed in said leak-proof tube, a diameter of said steel ball is not less than a diameter of said leak-proof tube.

3. The oil leaking prevention structure according to claim 2, wherein said bottom of said rectifying portion is provided with a off-centre hole at a corresponding position to said leak-proof tube; when said steel ball contacts with said rectifying portion, said steel ball does not block said off-centre hole, said off-centre hole communicates with said leak-proof tube.

4. The oil leaking prevention structure according to claim 3, wherein said rectifying portion is a recessing structure, a middle of said rectifying portion is recessed towards said liquid reservoir so that said essential oil in said rectifying chamber reflows into said liquid reservoir.

5. The oil leaking prevention structure according to claim 2, wherein said leak-proof portion includes an elastic ring arranged at a side of said leak-proof tube close to said spraying port,
    one side of said elastic ring is connected with said spraying port, another side of said elastic ring is horn-shaped and contacts with said steel ball elastically, however when said steel ball and said elastic ring contact, said rectifying chamber is separated from said spraying port so as to prevent said essential oil from leaking from said spraying port.

6. The oil leaking prevention structure according to claim 5, wherein said sidewall of said leak-proof tube close to said elastic ring is provided with a limited portion for said steel ball, said limited portion is disposed around an inner wall of said leak-proof tube; when said steel ball and said elastic ring contact, said limited portion limits said steel ball and defines a deformation degree of said elastic ring.

7. An aromatherapy machine, comprising:
    a shell;
    an oil leaking prevention structure, comprising a rectifying chamber, arranged in said aromatherapy machine, one side of said rectifying chamber communicates with a spraying port of said aromatherapy machine, another side of said rectifying chamber communicates with a liquid reservoir, some essential oil is stored in said liquid reservoir and is atomized into mist, said mist enters said rectifying chamber and is ejected from said spraying port;
    wherein, said rectifying chamber includes a rectifying portion and a leak-proof portion, said rectifying portion is disposed at a side of said spraying port, said leak-proof portion is disposed between said spraying port and said rectifying portion, said rectifying portion communicates with said leak-proof portion to stabilize a flowing amount of said mist ejected from said rectifying chamber; said leak-proof portion is used for preventing said essential oil from leaking from said spraying port when said liquid reservoir topples and falls, when said liquid reservoir topples and falls, said leak-proof portion blocks said spraying port; and
    said leak-proof portion includes a leak-proof tube, one end of said leak-proof tube communicates with said spraying port, another end of said leak-proof tube is connected with a bottom of said rectifying portion; a sidewall of said leak-proof tube adopts a hollowed-out structure, where slots divide the sidewall into several independent segments; said mist in said rectifying chamber enters said leak-proof tube from said hollowed-out structure; said bottom of said rectifying portion adopts another hollowed-out structure, said essential oil in said liquid reservoir enters said rectifying chamber from said another hollowed-out structure a pump mechanism disposed in said shell and communicated with said liquid reservoir, said pump mechanism is used for atomizing said essential oil in said liquid reservoir;

a leak-proof ring is disposed between said rectifying chamber and said liquid reservoir, said leak-proof ring is used for preventing said essential oil in said liquid reservoir from leaking from a gap.

8. The aromatherapy machine according to claim 7, wherein said rectifying chamber, said liquid reservoir and said shell are detachably connected, said rectifying chamber and said liquid reservoir are inserted into said shell from a top of said shell;

a side wall of said rectifying chamber is provided with a guiding slot, a side wall of said shell around said rectifying chamber is provided with a guiding block, said guiding slot and said guiding block are slidingly connected, said guiding slot and said guiding block are used for aligning a gas channel between said rectifying chamber and said pump mechanism.

9. The aromatherapy machine according to claim 7, wherein said rectifying chamber is provided with a connecting tube, one side of said connecting tube communicates with said pump mechanism, another side of said connecting tube communicates with a delivering hose, said delivering hose extends into the essential oil in the liquid reservoir; an end section of said delivering hose is V-shaped;

a leak-proof base is disposed between said pump mechanism and said connecting tube, said leak-proof base provides better air tightness between said pump mechanism and said connecting tube, and prevents air leakage;

said connecting tube includes an inlet tube and an oil outlet tube, one end of said inlet tube communicates with said pump mechanism, another end of said inlet tube is provided with an increasing pressure hole; one end of said oil outlet tube enters said liquid reservoir, another end of said outlet tube is provided with a positive pressure hole, said increasing pressure hole and said positive pressure hole are close to each other, a pore size of said positive pressure hole is gradually narrowed from a side close to said oil outlet hole to a side away from said oil outlet hole.

* * * * *